US011719135B2

(12) United States Patent
Araya Matteo (10) Patent No.: US 11,719,135 B2
(45) Date of Patent: Aug. 8, 2023

(54) SYSTEM AND METHOD FOR OBTAINING POWER BY THE USE OF LOW-QUALITY HYDROCARBONS AND HYDROGEN PRODUCED FROM THE WATER IN THE GENERATION OF COMBUSTION ENERGY

(71) Applicant: Julio Cesar Araya Matteo, Concon (CL)

(72) Inventor: Julio Cesar Araya Matteo, Concon (CL)

( * ) Notice: Subject to any disclaimer, the term of this patent is extended or adjusted under 35 U.S.C. 154(b) by 0 days.

(21) Appl. No.: 17/639,816

(22) PCT Filed: Sep. 2, 2020

(86) PCT No.: PCT/IB2020/058184
§ 371 (c)(1),
(2) Date: Mar. 2, 2022

(87) PCT Pub. No.: WO2021/044318
PCT Pub. Date: Mar. 11, 2021

(65) Prior Publication Data
US 2022/0325638 A1    Oct. 13, 2022

Related U.S. Application Data

(60) Provisional application No. 62/894,902, filed on Sep. 2, 2019.

(51) Int. Cl.
| | | |
|---|---|---|
| *F02M 25/025* | (2006.01) | |
| *F01K 23/06* | (2006.01) | |
| *B01J 19/24* | (2006.01) | |
| *B01J 19/26* | (2006.01) | |
| *C01B 3/34* | (2006.01) | |

(52) U.S. Cl.
CPC ........... *F01K 23/068* (2013.01); *B01J 19/245* (2013.01); *B01J 19/26* (2013.01); *C01B 3/34* (2013.01);
(Continued)

(58) Field of Classification Search
CPC .... F02M 25/025; F01K 23/068; B01J 19/245; B01J 19/26; B01J 2219/00822;
(Continued)

(56) References Cited

U.S. PATENT DOCUMENTS

| | | | |
|---|---|---|---|
| 6,149,765 | A | 11/2000 | Mansour et al. |
| 9,885,478 | B1 | 2/2018 | May et al. |

(Continued)

FOREIGN PATENT DOCUMENTS

| | | |
|---|---|---|
| CA | 2581288 A1 | 7/2006 |
| CN | 101988701 A | 3/2011 |

(Continued)

OTHER PUBLICATIONS

Huaqing Xie, et al., "Thermodynamic Analysis of Hydrogen Production From Model Compounds of Bio-Oil Through Steam Reforming", Environmental Progress & Sustainable Energy, vol. 33, No. 3, pp. 1008-1016, 2014.

(Continued)

*Primary Examiner* — Hai H Huynh
(74) *Attorney, Agent, or Firm* — Lucas & Mercanti, LLP (57) ABSTRACT

A system for obtaining power by the use of low-quality hydrocarbons and hydrogen produced from the water in the generation of combustion energy having: a combustion chamber; a nozzle support module located at the proximal extremity of the combustion chamber; at least one principal nozzle (S) and at least one start-up burner nozzle (P), a number of spark igniter electrodes (H) located in the nozzle support module; at least three hermetic chambers connected in series covering the length of a flame, where a vaporisation chamber, a gasification chamber and at least one thermal cracking chamber surround the combustion chamber; a flame outlet, located at the distal extremity of the combustion chamber.

20 Claims, 8 Drawing Sheets

(52) U.S. Cl.
CPC ............. *B01J 2219/00822* (2013.01); *B01J 2219/00837* (2013.01)

(58) Field of Classification Search
CPC ... B01J 2219/00837; B01J 2219/00157; C01B 3/34; C01B 3/042; C01B 3/24; C01B 2203/062; C01B 2203/0811
USPC ............ 123/1 A, 2, 3, 25 A, 25 C, DIG. 12
See application file for complete search history.

(56) References Cited

U.S. PATENT DOCUMENTS

| | | |
|---|---|---|
| 2002/0031690 A1 | 3/2002 | Shimazu et al. |
| 2009/0077890 A1 | 3/2009 | Pearson |

FOREIGN PATENT DOCUMENTS

| | | |
|---|---|---|
| WO | 2006076801 A1 | 7/2006 |
| WO | 2008068156 A1 | 6/2008 |
| WO | 2010053387 A1 | 5/2010 |
| WO | 2014135754 A1 | 9/2014 |
| WO | 2015041555 A1 | 3/2015 |

OTHER PUBLICATIONS

Panagiotis N. Kechagiopoulos, et al., "Sustainable Hydrogen Production via Reforming of Ethylene Glycol Using a Novel Spouted Bed Reactor", Catalysis Today, vol. 127, pp. 246-255, 2007.

International Search Report and Written Opinion dated Dec. 17, 2020 for PCT/IB2020/058184 and English translation, 32 pages.

SYSTEM AND METHOD FOR OBTAINING POWER BY THE USE OF LOW-QUALITY HYDROCARBONS AND HYDROGEN PRODUCED FROM THE WATER IN THE GENERATION OF COMBUSTION ENERGY

CROSS REFERENCE TO RELATED APPLICATION

This Application is a 371 of PCT/IB2020/058184 filed on Sep. 2, 2020, which claims the benefit of U.S. Provisional Application No. 62/894,902 filed on Sep. 2, 2019, the contents of each application are incorporated herein by reference.

FIELD OF THE INVENTION

The invention refers to the field of energy and chemistry, more specifically to a system and method for the efficient use of hydrocarbons of low-quality, such as used oils, for the generation of combustion of said oils, in combination with the separation and use of hydrogen obtained from water, thereby achieving continuous combustion as a source of energy for boilers, thermal power plants or other forms of use of the heat obtained from the combustion of oil and treated fresh or salt water. This allows the use of hydrocarbons of low-quality, for example, waste oil, in a clean way, due to the high water content present in the combustion, reaching 50% water and 50% oil, from 100% oil, which allows an efficient burning of the oil to be burned with low levels of contamination. In other words, waste oil is used as a source of energy.

The present invention integrates the Fischer Tropsch, thermal cracking and thermolysis methods in a single cycle, where the Fischer Tropsch method is used to obtain the fuel synthesis gas, from the production of liquid hydrocarbons, such as: lubricants, gasoline, kerosene and diesel oil, which is an intermediate product fed to the thermal cracking method, to the thermolysis by which hydrogen is produced with a reduced reaction temperature. The combustion of the generated hydrogen is executed in the same system, providing as a final result low-cost energy, which can be used in different applications, such as heating boilers, for the generation of electric energy through vapor/steam, or any other equipment that requires heat energy for its operation.

State of the Art

In the state of the art, there is the Fischer Tropsch process, which is a technology that converts hydrocarbon fuels into gas and, or the synthesis of liquid fuel from syngas. This process is reversible and the intermediate state of the substance is a mixture of hydrogen with carbon monoxide, called gas synthesis (CO+H2).

This chemical property of hydrocarbons was first applied on an industrial scale by the German scientists Fischer and Tropsch in 1920 for the production of synthesized fuels and is still the most widely used, despite the economic disadvantage.

The process losses lie in the fact that significant energy costs are required for actual production and, therefore, fuel synthesis does not stand up to competition compared to the main source of hydrocarbon-based liquid fuels, oil refining. But, considering the fact that, the process is flexible and versatile, it is often used in applications for processing hydrocarbon wastes, waste oil, etc.

The first part of the Fischer Tropsch process, corresponding to the hydrocarbon gasification and the conversion to gas synthesis, is of relevance to the present technology.

Thermal cracking (cracking) is a chemical process that breaks down the molecules of a compound to produce simpler compounds, where the basic process uses pressure and temperature, which has an operating range between 800 and 850° C. In addition, there is catalytic cracking, which operates at a temperature between 450 and 500° C. and is lower in temperature than thermal cracking, due to the use of a catalyst.

Referring to the thermolysis process, the essence of the reaction is to break the water molecules into their constituent parts, hydrogen and oxygen. This process is considered costly as it consumes a large amount of energy. Water is a stable element with strong intermolecular bonds, so that, in order to separate hydrogen from oxygen, it is necessary, in particular for thermolysis, to create a temperature of the reaction medium of about 2500° C. degrees or higher.

With respect to the prior art documents, we refer first to publication WO2014135754A1 describing the treatment of carbonaceous material employing thermolysis to obtain a combustible condensate, part of this fuel can be employed to feed the same reactor. This method does not solve the problem of combustion of hydrogen from water, but is oriented to take advantage of the carbonaceous particulate material.

Document CN101988701 refers to a method of burning water, using thermolysis and gasification to provide clean and cheap energy. However, there is no reference to the use of low-quality fuel hydrocarbons. In addition, it uses a self-combustion furnace.

Document WO2010053387A1 describes a method and a reactor for the thermal decomposition of water, which includes means for centrifugal separation of hydrogen and oxygen in a plasma reactor at a high temperature of 27,000° C. In this device, thermolysis is carried out at high pressure and very high temperature together with centrifugal forces, which implies tremendous expenditure of energy. The means to obtain hydrogen are different and the energetic transformation of the fuel gas to feed a consumption is excluded In addition, the investment refers to a Plasma Reactor that works at 27,000° C. and is made of tungsten.

With the present invention, it is achieved to provide a system and method to produce thermal energy with a lower energy and fuel cost, through the use of low-quality hydrocarbons, as a source of energy, and wherein, part of the energy generated is used in the same system, to separate the hydrogen from the oxygen present in the water and use them as fuel, in a clean way, which allows an efficient combustion of the oil, which implies, low pollution levels and the reuse of waste oils, where said oils, imply a source of pollution. In other words, the present technology is not only efficient in fuel consumption, but it is also environmentally friendly by reducing polluting oils and transforming them into useful energy with low atmospheric pollution, due to the high flame temperature of over 700° C.

SUMMARY OF THE INVENTION

The present technology is a system and method consisting of a burner with a thermal cracking reactor capable of generating useful energy with recycled oil, waste from automobiles and machinery, mixed with water as part of the fuel, thereby increasing the combustion temperature and thus lowering the pollution indexes. In another preferred configuration, in the thermal cracking reactor, thermolysis can be carried out.

The system is made in the form of a boiler burner, where the burner tube passes through at least three individual and interconnected phases to exchange the reaction intermediate products. Said exchanged products are in gaseous form. The phases are the part of the reactor where the conditions for the synthesis of hydrogen from water and hydrocarbons are created, and correspond to at least three stages of the associated method. In the first vaporization phase, which takes place inside a vaporization chamber (10), water is converted into vapor in the vaporization chamber which is the first chamber, which is an integral part of the fuel in a significant amount of the total volume of the mixture. In the second phase or gasification phase, which takes place inside a gasification chamber (20), water vapor is mixed with a low-quality liquid hydrocarbon, and hydrocarbon gasification at high temperature takes place. In the third phase of gas and vapor mixing, which takes place inside the gas and vapor chamber (30), which is the third chamber, the conditions for the Fischer Tropsch reaction are created, with the preparation of a mixture of hydrogen gases, carbon monoxide, carbon dioxide and water vapor, in which, in addition, thermal cracking is generated, where the extreme vapor and that of the hydrocarbon gases are converted into hydrogen. In this third phase the carbon and oxygen atoms are attracted to each other, forming $CO$; $CO_2$ and leaving the Hydrogen free, passing to the fourth phase by increasing the temperature.

To achieve thermal cracking conditions, a gas with a high percentage of hydrogen is obtained, which flows towards the burner nozzle due to pressure differences and is continuously combusted to produce thermal energy. Part of the thermal energy is used for the operation of the same reactor, and the rest, which is the majority, is available to feed or be used as a source of energy for heating: the water of a turbine for the power generation, a boiler, a power cogenerator or for any equipment that requires energy in the form of heat for its operation.

OVERVIEW OF THE INVENTION

In the present application, an apparatus for extracting hydrogen from water by several processes combined in a series circuit is provided. They include the vaporization process, the gasification process, followed by the hydrogen saturation of the starting gases based on the Fisher-Tropsch principle and finally the thermal cracking process, which depending on the temperature can reach thermolysis.

Only part of the Fischer Tropsch process, the gasification of hydrocarbons and the conversion to gas synthesis, is used in this invention. These steps are also the least expensive part of the method.

$$C+H_2O=CO+H_2$$

Universal formula for alkane group:

$$CnH_2n+2+nH_2O=nCO+(2n+2)H_2$$

liquid fuels, from $C_5H_{12}$ a $C_{13}H_{28}$
the alkenes:

$$CnH_2n+H_2O=nCO+(2n+1)H_2$$

In the reaction, oxygen, hydrogen and carbon molecules are exchanged between hydrocarbons and water, where the oxygen atom in the water is attracted to the carbon atom forming molecules of carbon monoxide, carbon dioxide and hydrogen.

Although in this case, it is not necessary to obtain liquid fuel, the increase in hydrogen yield is important, so water vapor is added in excess, which changes the equilibrium of the reaction, as a result of which only carbon dioxide and hydrogen are formed, disregarding carbon monoxide.

This process does not require special environmental conditions in the reactor, such as high temperatures and high pressures. The first stage of the process is carried out in the vaporization phase in the vaporization chamber (10), which is designed to produce vapor that will constitute part of the volume of the mixture. The vapor temperature must be from 100° C. to 200° C. with pressure in the range of 1 to 5 bar.

The gasification is carried out at a temperature ranging from 260° C. to 400° C. and a pressure of 1 to 5 bar, in the gasification chamber (20).

The volume of the vaporization phase is obtained from the vapor flow rate sufficient to completely convert the water molecules to hydrogen through the process of all subsequent reactions and depends on the total design power of the reactor.

The vapor generation capacity and the desired temperature will depend on the flame inside the burner tube, which is selected in operation for this purpose. This regulation is made by selecting the diameter of the main nozzle (61), see FIG. 2, the spray angle of the nozzle hole and the distance from the beginning of the flame to the vaporization phase inside the vaporization chamber (10).

In this first stage, a uniform evaporation of the water is achieved, so that the reactor works in a stable manner.

The gasification phase that takes place in the gasification chamber (20) receives the previously separated vapor and a fuel, which can be diesel, waste oil or other liquid hydrocarbon or gas of any quality. In this second stage, the conditions for the gasification of the fuel are created by the aforementioned Fischer-Tropsch process. The objective is to obtain a synthesis gas, a mixture of hydrogen and carbon monoxide and carbon dioxide.

Figure 2:
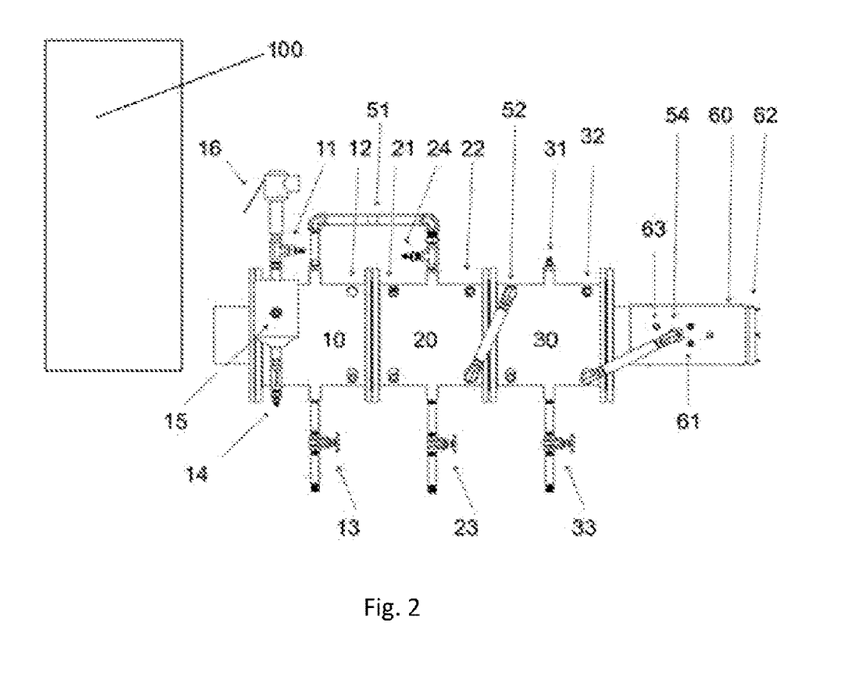
FIG. 2 shows an elevation view of the reactor, associated with FIG. 1.

The fuel is sprayed into the vapor flow by means of an injector provided in the atomizer (24), see FIG. 2. The size of the fuel droplets should not exceed 2 to 3 microns to produce an oil mist. This is achieved by higher pressure in the oil line to the injector and small dimensions of the oil spray nozzle. It is possible to apply a standard nozzle from industrial boiler burners. The quality of the gasification depends on the pressure supplied to the injector.

Optimum conditions were found within the gasification phase for the conversion of the liquid fuel mist mixed with water vapor into synthesis gas (CO+H2). Good results were obtained at temperatures from 300 to 500° C. with the pressure varying from 1 bar to 5 bar. Then, when the temperature in the second phase of the reactor increases, it is necessary to reduce the pressure for a normal reaction.

Synthesis gas bound with a mixture of water, in the form of unreacted superheated vapor enters the gas-vapor mixture phase in the gas-vapor chamber (30). In this third stage the product is heated to a temperature of 500 to 600 degrees Celsius and the reaction continues exchanging oxygen molecules with carbon, releasing hydrogen.

CO+H2O═CO2+H2

In a preferred configuration, the gas admitted to a second phase of gas and vapor mixture in a secondary gas and vapor chamber (40), which exceeds 800° C. reaching thermal cracking, where the gas is as saturated with hydrogen as possible by the previous application of the Fischer-Tropsch process. In this fourth stage, the temperature is kept as high as possible, from 800° C. upwards, in order to produce a gas saturated in hydrogen that must go from the reactor to the main nozzle, where it will be burned to generate energy.

The exhaust gases generated by a burner like the one illustrated are basically water vapor and carbon dioxide, in a percentage of 6%. Regarding the emission of harmful substances in exhaust gases, carbon monoxide tends to zero, therefore, it is an important contribution to the environment.

To ensure optimal operation, an oil/water flow control automation system is necessary to ensure stable operation, which is optimized with automatic control systems that measure the temperature and pressure of each chamber (10, 20, 30, 40), inlet and outlet flow rates of the different fluids in each chamber, flame temperature, and/or measurement of the exhaust gases, among other variables, to optimize the flame temperature and ensure that it is below the melting temperature parameters of the materials that make up the reactor.

Figure 1:
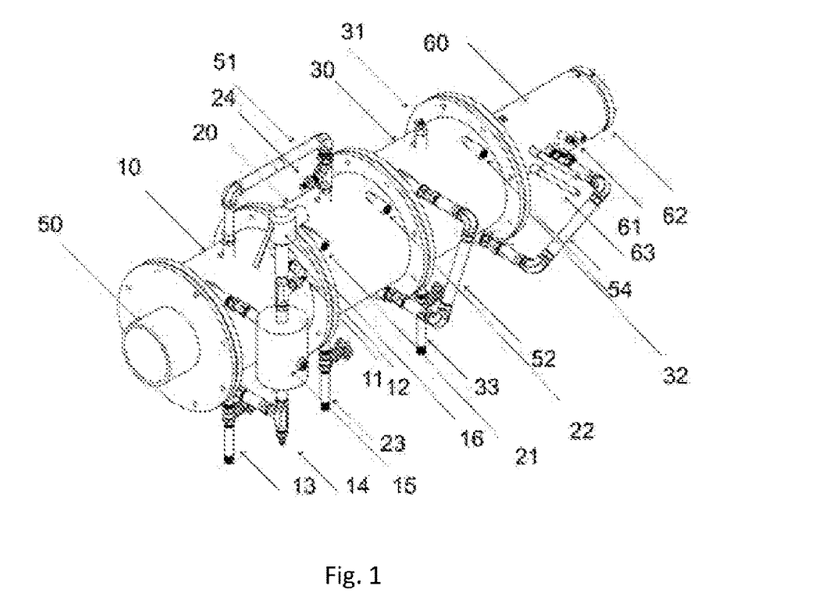
FIG. 1 shows a schematic perspective view of the reactor, in a preferred embodiment of three phases.
Figure 3:
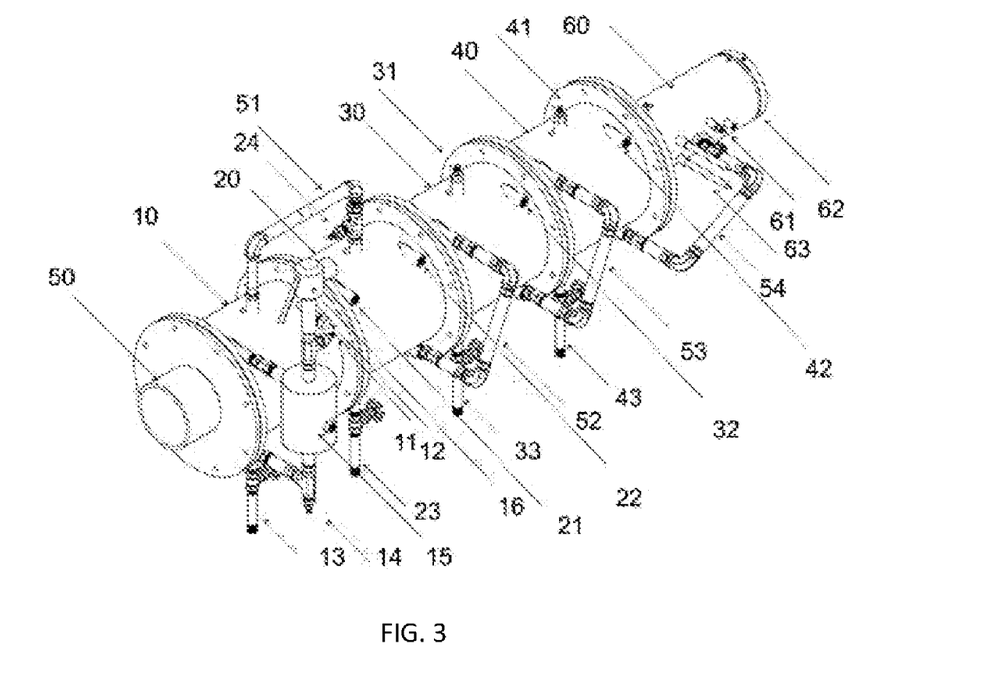
FIG. 3 shows a schematic perspective view of the reactor, in a preferred embodiment with four phases.
Figure 4:
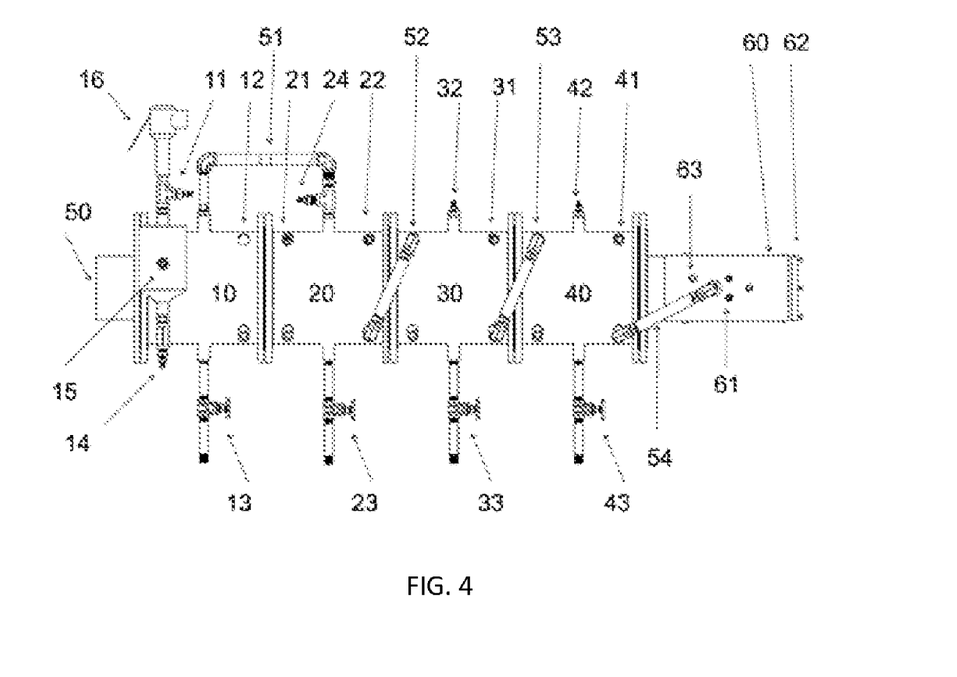
FIG. 4 shows an elevation view of the reactor, associated with FIG. 3.

One of the preferred configurations of the present invention is referred to FIG. 1, which has three chambers (10, 20, 30) and FIGS. 3 and 4; are a preferred configuration, where the reactor has four chambers (10, 20, 30, 40) shaped like two rooted cylinders of different diameters. The structure of each phase is divided into two cavities: the furnace cavity or burner tube, located in the center, and the other cavity, which is the reaction chamber.

To define such cavities, each chamber (10, 20, 30, 40) includes an inner cylinder made of molybdenum, lanthanum or other material with melting point above 1500° C. and an outer cylinder made of steel or other material with thermal conductivity less than 100 W/(m° K).

The materials of the combustion chamber (90) or inner cylinder and the three or four or more chambers (10, 10A, 20, 30, 40), are chosen from molybdenum, lanthanum/ tantalum, tungsten, ceramics, zirconium, chrome, iridium, nickel, stainless steels or a mixture of them. Among the stainless steels, low carbon steels such as 304, 304L, 308, 316 and 316L are preferably selected. It is worth mentioning that the material composition of the combustion chamber (90) must have a melting point above 1100° C. and must also have a high heat transmission coefficient, which is why, in another preferred configuration, a double tube was used for the combustion chamber (90), a double tube wherein the inner tube is made of a material with higher temperature resistance, such as iridium, molybdenum, lanthanum/tantalum, tungsten, nickel, ceramics, and an outer tube with materials with lower temperature resistance but with higher heat transmission coefficient such as zirconium, chromium, stainless steels, among other metals.

In another preferred configuration, the combustion chamber tube (90) is formed by various sections with different chemical compositions of materials, depending on the thermal requirements, i.e. each section of the combustion chamber tube (90) may not necessarily be the same as the chemical compositions of materials of the next chamber, wherein the different chemical compositions of materials can be iridium, molybdenum, lanthanum/tantalum, tungsten, chromium, ceramics, and the following sections can be zirconium, chromium, stainless steels, among others.

For a better control of the fluid levels inside the cavities of each chamber (10, 10A, 20, 30, 40), these also include minimum and maximum level sensors, which are mechanically or electronically operated, where the electronic sensors send signals to a computer that controls the flow of fluids, and the temperature of the combustion chamber and said computer also receives the information of the exhaust gases, the temperature of the flame and the temperature and pressure of the cavities of each chamber (10, 20, 30, 40) through temperature and pressure sensors located in the cavities of each chamber (10, 20, 30, 40).

For a better chemical reaction, at least one catalyst is used, in a preferred configuration the nickel, metal, ceramic or zinc oxide catalyst, which can also be porous.

The chambers must be hermetically sealed for the reaction volume in each of them, in order to generate the furnace and reaction cavities.

In another preferred configuration, a combination between a waste hydrocarbon and water is expected, amounting to 90% water and 10% waste hydrocarbon, from 100% waste hydrocarbon, which allows for an even more efficient burning of the waste hydrocarbon. Where the waste hydrocarbon can be replaced by pulverized coal. The water used can be fresh water, graywater, treated blackwater or salt water.

In another preferred configuration, and in order to have an efficient heat transfer to the interior of the cavities each chamber (10, 20), the liquid fluids are in contact with the outer surface of the combustion chamber (90), on at least 25% of the outer surface of the combustion chamber tube (90) in the cavities each chamber (10, 20).

DETAILED DESCRIPTION OF THE INVENTION

A system for obtaining energy through the use of low-quality hydrocarbons and hydrogen produced from water in the generation of combustion energy, where part of the energy generated is used in the operation of the same system, achieving high efficiency and low levels of pollution, comprising:

a combustion chamber (90) with a proximal end and a distal end;

a nozzle support module (60) located at the proximal end of the combustion chamber (90);

at least one main combustion gas outlet nozzle (S), FIG. 3, and at least one starting burner nozzle (P), FIG. 3, photocell (F), FIG. 3, two high voltage spark gap electrodes (H), FIG. 3, both located in the nozzle support module (60);

at least three hermetic chambers (10, 20, 30) connected in series through connections (51, 52, 53, 54), which cover the length of a flame, wherein a vaporization chamber (10), a gasification chamber (20) and at least one thermal cracking chamber (30) surround the combustion chamber (90);

a flame outlet, located at the distal end of the combustion chamber (90); Y where the combustion chamber (90) and the at least three preheating chambers (10, 20, 30) are built with materials with a melting point greater than 1100° C.

In a preferred configuration, it also comprises a fourth phase (40), wherein a second gas-vapor mixture phase (40) is carried out, which is connected in series with the gas-vapor mixture phase (30) through a connection pipe (53).

In another preferred configuration, the materials of the combustion chamber (90) and the three or four or more chambers (10, 10A, 20, 30, 40), are chosen from molybdenum, lanthanum, tantalum, tungsten, ceramics, zirconium, chrome, iridium, stainless steels or a mixture of them. Among the stainless steels, low carbon steels such as 304, 304L, 308, 316 and 316L are preferably selected.

In another preferred configuration, a fan (62) is located at the proximal end of the nozzle support module (60) to enhance combustion.

In another preferred configuration, the nozzle support module (60) also comprises:

a secondary nozzle (P) with a fuel inlet and compressed air inlet, for process start-up.

In another preferred configuration, temperature sensors are located in each of the chambers.

In another preferred configuration, pressure sensors are located in each of the chambers.

In another preferred configuration, cleaning ports are located in each of the chambers.

In another preferred configuration, the temperature sensors and pressure sensors deliver information to a computer, either wired or wireless.

In another preferred configuration, the cleaning ports are manual cleanup ports.

In another preferred configuration, the system also comprises a fifth chamber (10A), wherein a second vaporization phase (10A) is carried out, wherein the fifth chamber (10A) is connected in series between the vaporization chamber (10), the gasification chamber (20) of mixture of gases and vapor (30) through at least one connection pipe (51A). It is worth mentioning that this fifth stage, corresponding to the second vaporization phase (10A) manages to further increase the temperature of the vapor even above 300° C.

The chemical composition of the elements that make up the reactor, to withstand temperatures above 1400° C., comprises:

at least 15% Nickel; and at least 15% Chromium.

In another preferred configuration, to further increase the melting temperature, it further comprises the following elements that make up the reactor, to withstand temperatures above 1600° C.: at least 2% Tungsten; and at least 2% Molybdenum, it can also include at least 1% Iridium, as well as at least 1% Tantalum, to achieve a higher melting temperature.

In another preferred configuration, it further comprises the following elements making up the reactor: at least 1% cobalt and/or at least 1% iron and/or at least 0.1% magnesium and/or at least 0.1% silicon.

In another preferred configuration, also includes the following element that makes up the reactor: at least 1% stainless steel, where stainless steel is low carbon, such as stainless steel 304, 304L, 308, 316 and 316L.

The advantages of these chemical compositions of the elements that make up the reactor achieve an efficient heat transfer and at the same time, a greater increase in melting temperature, above 1400° C. or more, and even above 2000° C. due to the temperature of thermolysis.

In another preferred configuration, each section of the combustion chamber (90) related to each chamber (10, 10A, 20, 30, 40) are made with different chemical compositions of matter between them.

In another preferred configuration, the combustion chamber (90) comprises at least two tubes, one inside the other, where an inner tube has a higher melting point than an outer tube, with this greater thermal resistance is achieved, which translates into an increase in melting point and good thermal conductivity. This is because materials with a melting point above 1200° C. tend to be less heat conductors.

In another preferred configuration, the combustion chamber (90) is internally covered with ceramic material, to increase resistance to temperatures above 2000° C.

In another preferred configuration, each chamber (10, 10A, 20, 30, 40) is covered by a thermally insulating material, to reduce heat transfer to the environment, where the thermally insulating material is chosen from cement, ceramics, ceramic fiber, ceramic paint, ceramic paper, fiberglass, because these materials can withstand at least 1000° C. and even 1480° C. as is the case with ceramic fiber.

A method for obtaining energy through the use of low-quality hydrocarbons and hydrogen produced from water in the generation of combustion energy, where part of the energy generated is used in the operation of the same system, achieving low contamination levels, comprises the steps of:

converting into water vapor the water in a vaporization chamber (10) in the vaporization phase (10), which is an integral part of the fuel in a significant amount of the total volume of the mixture;

mixing the water vapor with a liquid low-quality hydrocarbon, in a gasification chamber (20) in the gasification phase (20), and the gasification of hydrocarbons at high temperature takes place;

generating the Fischer Tropsch reaction, in gases and vapor (30), in the gas and vapor mixture phase (30), with the preparation of a gas mixture of hydrogen, carbon monoxide and carbon dioxide.

In another preferred configuration, it further comprises the step of:

generating the thermolysis in a fourth chamber (40), in the thermolysis phase (40), wherein the extreme vapor and that of the hydrocarbon gases, where carbon and oxygen atoms are attracted to each other constituting CO; $CO_2$ and leaving the Hydrogen free, wherein the thermolysis of the water is generated at a temperature lower than 2500° C. due to the presence of carbon delivered by the mixture of the hydrocarbon vapors that provide carbon to water vapor.

In another preferred configuration, it also comprises the step of: increasing the temperature of the water vapor in a fifth chamber (10A), in the vaporization phase (10A) coming from the vaporization chamber (10), wherein the water vapor is further heated, to enter said water vapor above 250° C. into the gasification chamber (20) in the gasification phase (20).

In another preferred configuration, the mixture between water vapor and hydrocarbon vapor in the Fischer Tropsch reaction, corresponding to chamber (30), is at least 10% water vapor and the differential is hydrocarbon vapors.

In another preferred configuration, the mixture between water vapor and hydrocarbon vapor in the Fischer Tropsch reaction, corresponding to chamber (30), is at least 50% water vapor and the differential is hydrocarbon vapors.

At the stage of converting water into water vapor in a vaporization chamber (10), to form water vapor is fresh water, graywater, treated blackwater or salt or sea water.

Example 1

The dimensions indicated below are only for the purpose of illustrating an embodiment, which in this case is an example, not implying any limitation to the protected subject matter.

General measurements for the boiler test reactor burner include:
  Total length of the equipment 1700 mm.
  Length of each phase 300 mm (with 20 mm thick flanges each).
  Inner barrel diameter (molybdenum) 152 mm (6 in), 8 mm thickness.
  Outer barrel diameter (steel) 254 mm (10 in), 6.3 mm thickness.

The flanges at the ends of each phase are identified between male flange (71) and female flange (72), the male flange has an annular projection (73) with a 45° bevel and the female flange has an annular notch (74) that receives said projection tightly. The female flange (72) extends both out of the outer barrel (75) and through the annulus to the inner barrel (76) and has its inside diameter beveled into a V, while the male flange (71) only projects out of the outer barrel. It is worth mentioning that, for better sealing, the flanges with the tube of the combustion chamber are adjusted by interference, as well as other elements of the reactor.

The inner barrel (76) made of molybdenum has 45° bevels for a tight fit between female flanges of adjacent phases.

The outer barrel (75) made of stainless steel and is welded with both flanges (71, 72), made of the same material.

The outer barrel (75) of each phase has helical blades (77) incorporated following a helical path, to favor the active mixture of gases and the stabilization of the reaction temperature in the zone.

With reference to FIGS. 8 to 11, external flanges (80) are used at the ends of the reactor to support an inlet funnel (78) and an outlet funnel (79) respectively, joined by welding.

Figure 11:
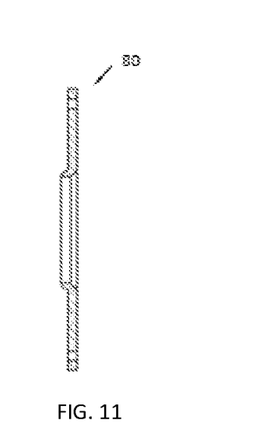
FIG. 11 shows a sectional view of the outer flange.

The inlet funnel (78) is a barrel portion with a side window to allow air intake and facilitate the location of the components mounted on the nozzle support module (60), or FIG. 11, including the main nozzle (61), the pilot light, the ignition electrodes, a photocell to control the process, an oil inlet for burner start-up. Said module includes an air inlet with a fan (62), which is designed to create a turbulent flow regime in the combustion zone.

The outlet funnel (79) is an outlet tube for the combustion gases intended to feed the main intake/consumption.

Figure 12A:
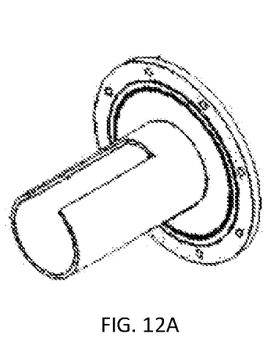
FIGS. 12A and 12B show perspective views of the inlet funnel.
Figure 12B:
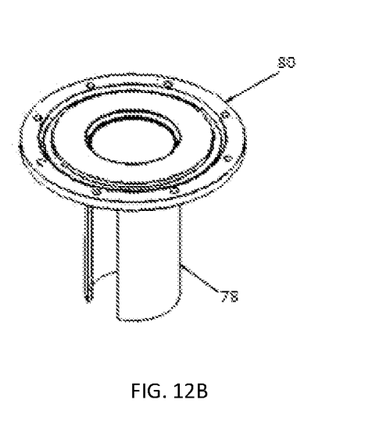
Figure 13A:
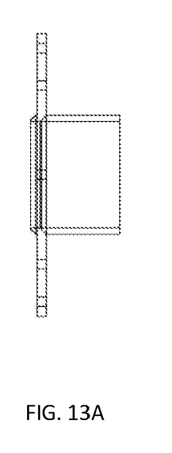
FIGS. 13A to 13C show views of the outlet funnel.
Figure 13B:
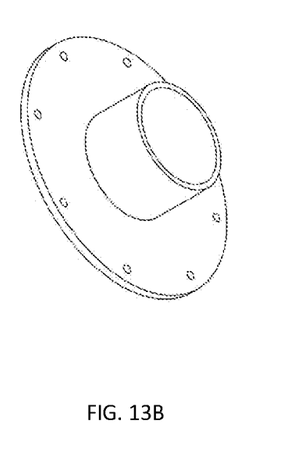
Figure 13C:
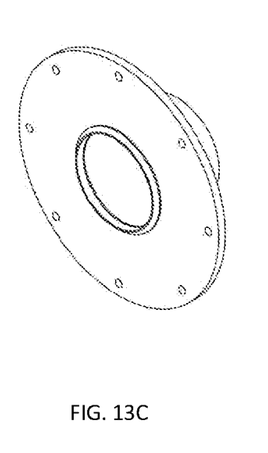
Figure 14:
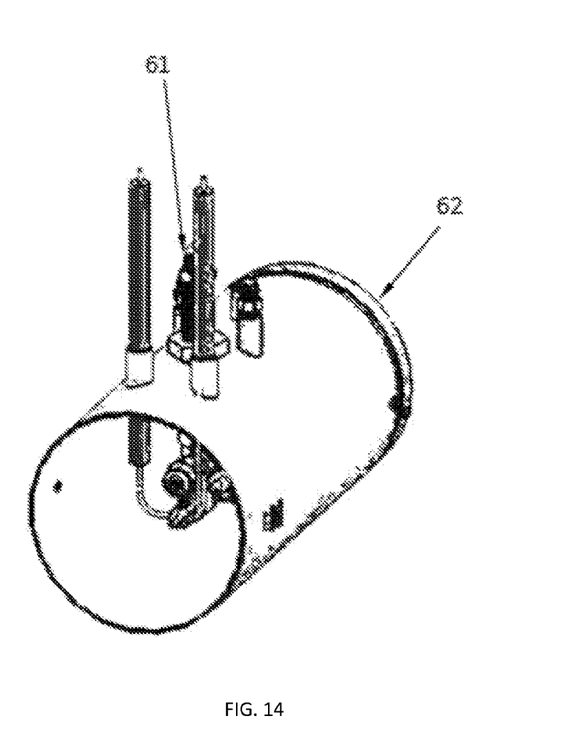
FIG. 14 shows main injectors, diesel injector, air injector and ignition electrodes.
Figure 15:
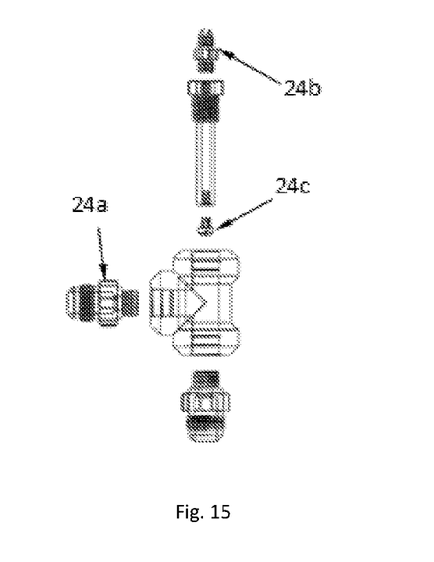
FIG. 15 shows an exploded view of the low-quality fuel atomizer.

The nozzle (24c), in FIG. 12, of the atomizer (24) for the inlet of low-quality oil or fuel, was calculated according to the required consumption. For example 0.5 mm for 15 LPM (3.9626 gal/m). The water inlet nozzle, in the water inlet (14) of FIG. 2, is selected from the same measurements as the atomizer nozzle.

As can be seen in FIGS. 3 and 4, the phases are interconnected by pipes for the transfer of intermediate reaction products.

Figure 5:
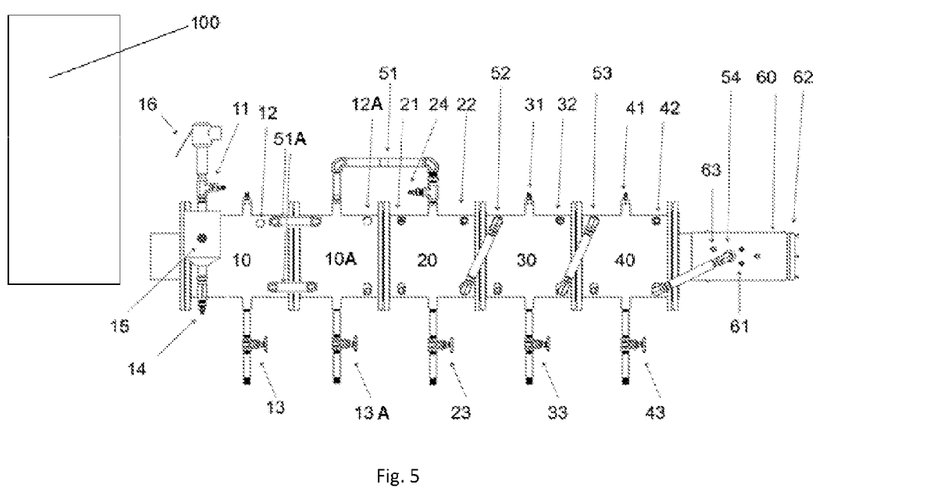
FIG. 5 shows a schematic perspective view of the reactor, in a preferred embodiment with five phases.
Figure 6:
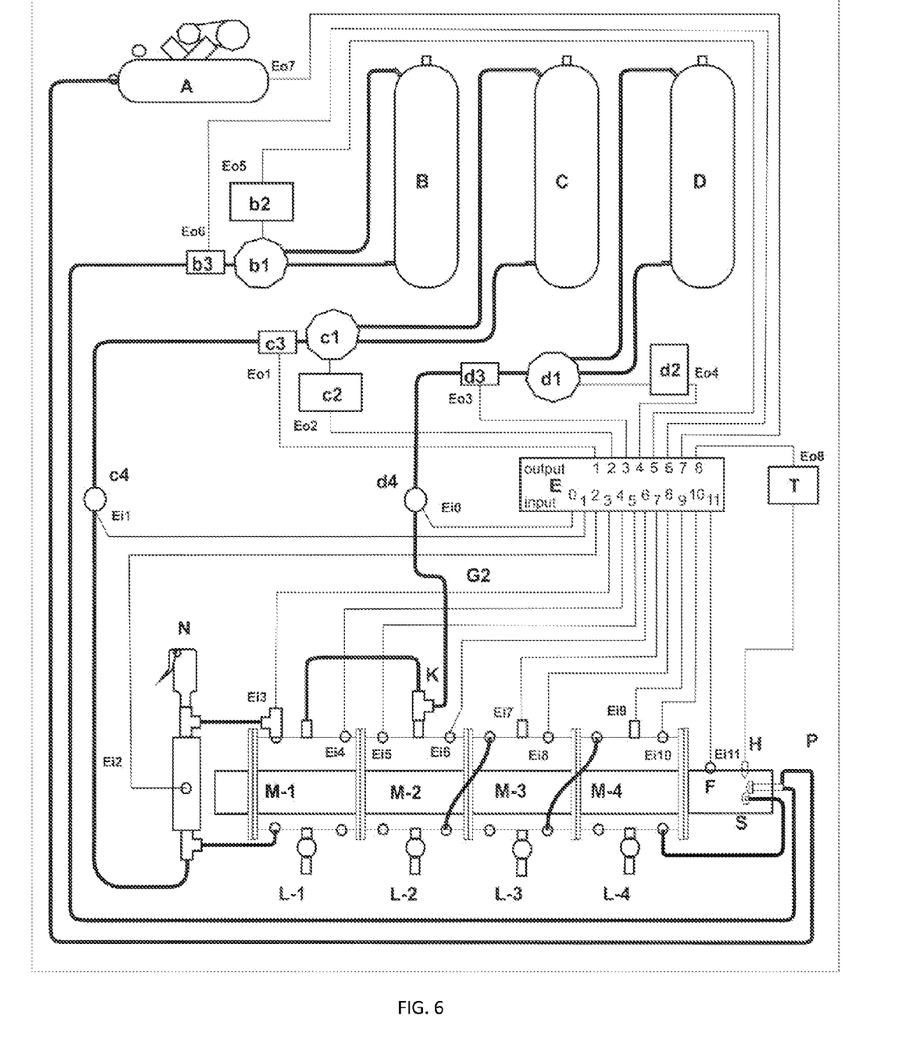
FIG. 6 shows a general connection diagram.
Figure 7:
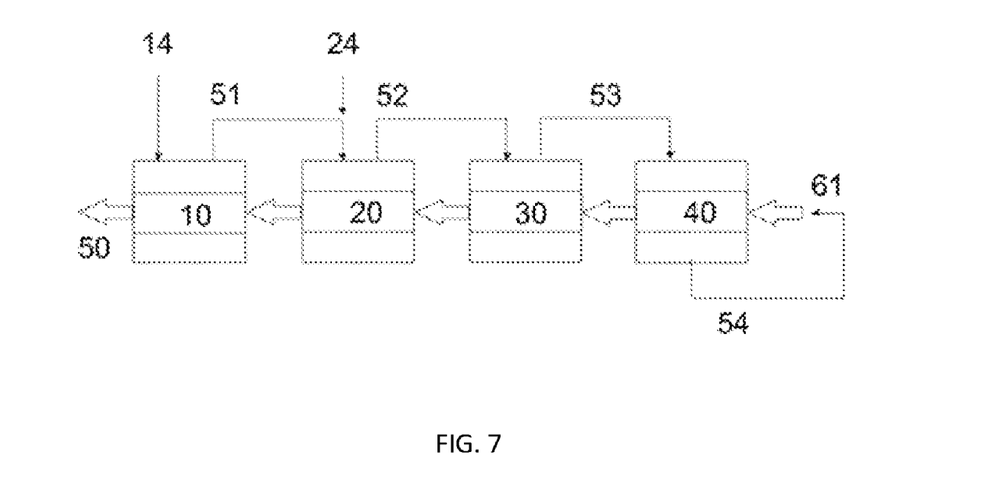
FIG. 7 shows a process diagram, with reference to the milestones of the process carried out by the reactor of the present invention with four phases.
Figure 8:
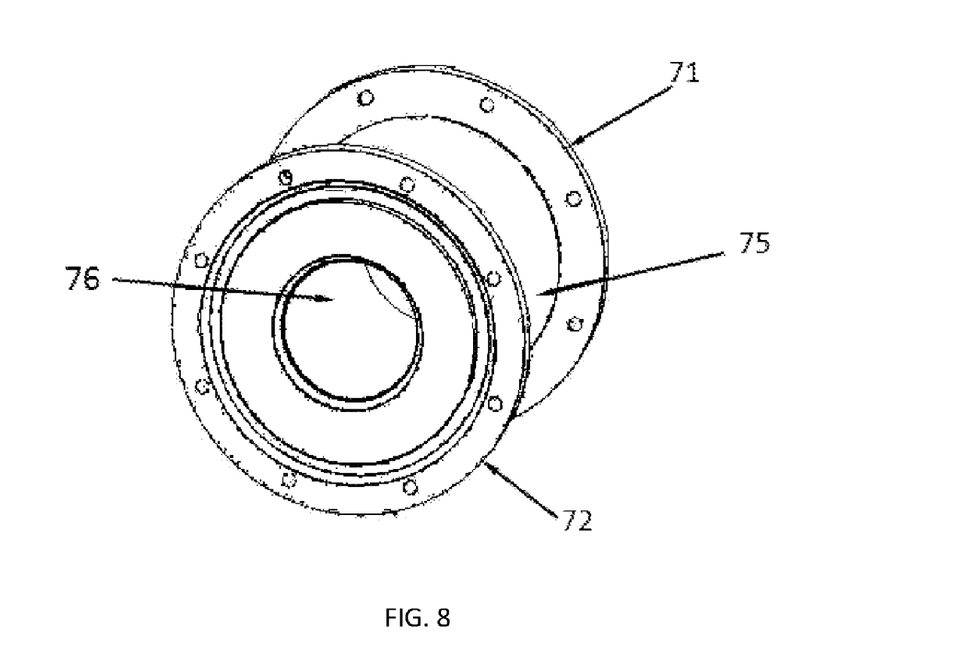
FIG. 8 shows the view of the flanges of the reactor phases, with the combustion chamber in the center.
Figure 9:
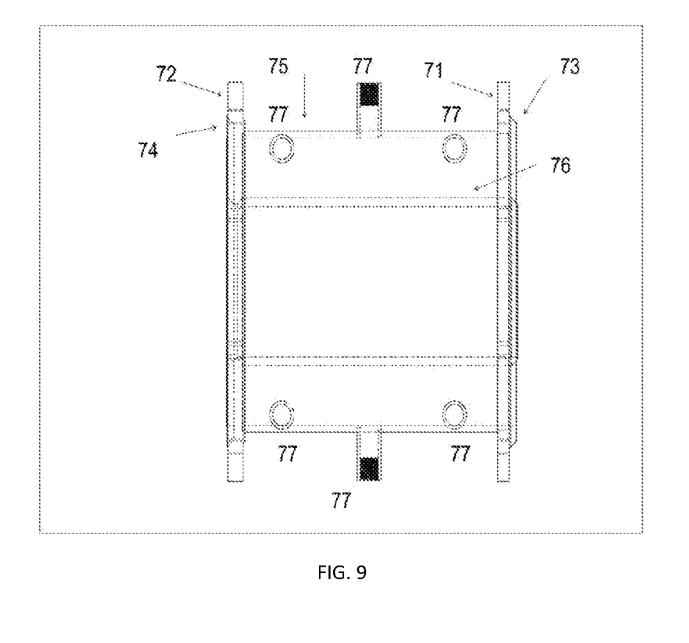
FIG. 9 shows components in phase plane.
Figure 10:
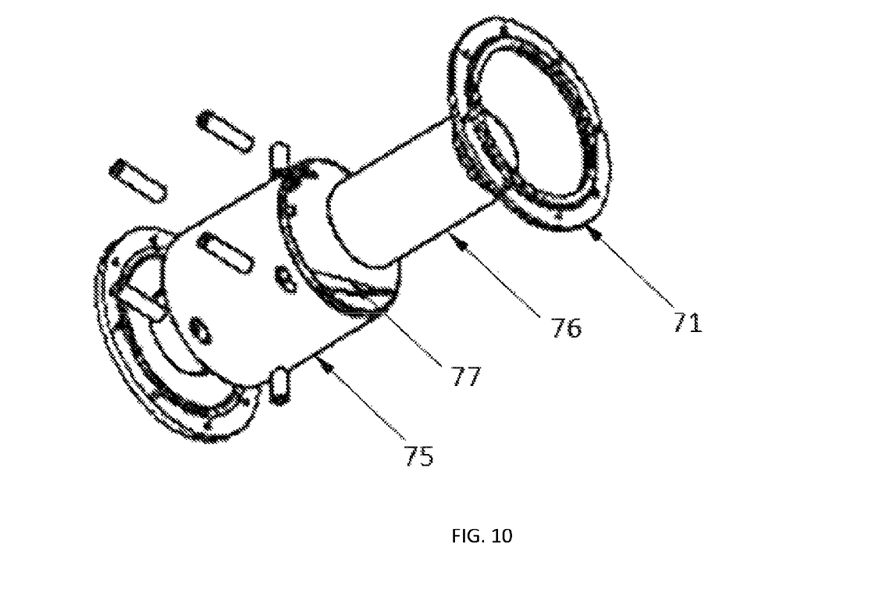
FIG. 10 shows an exploded perspective view of one phase of the reactor.

The operation detail of this example is shown in FIG. 5, which represents:
  A—AIR COMPRESSOR: 8 bar-12 bar in the line, 30 Lts-50 Lts (7.9252 gal/m-13.2086 gal/m) capacity.
  B—OIL POND (starting fuel): Capacity is calculated based on consumption.
  b1—gear pump for starting fuel. 20 bar, (¼ in) 6.35 mm, 0.3-1 LPM (0.079252 gal/m-0.2642 gal/m), 150 W 220V motor.
  b2—motor controller (START/STOP signal from general controller E is converted into motor start or stop)
  b3—Automatic valve: 40 bar, (¼ in) 6.35 mm, Needle.
  C—WATER TANK (Fuel component during operation) Capacity is calculated based on consumption and time of day.
  c1—high pressure water pump. (½ in) 12.7 mm inlet—(¼ in) 6.35 mm outlet, 20 bar, 0.3-5 LPM (0.079252 gal/m-1.3209 gal/m), 200 W 220V motor. Example: piston pump
  c2—motor controller (START/STOP signal from general controller [E] is converted into motor start or stop)
  c3—Automatic valve: 40 bar, (¼ in) 6.35 mm, Needle. To control water level in phase 1[M−1] of the reactor.
  c4—water flow controller: Flowmeter—Turbine, Communication Protocol—Pulse, (¼ in) 6.35 mm, 0.3-5 LPM (0.079252 gal/m-1.3209 gal/m)
  c5—water inlet in phase 1 [M−1] of the reactor
  D—OIL TANK (Second component of fuel during operation) Capacity is calculated based on consumption and time of day.
  d1—gear pump for driving/operation fuel. 20 bar, (¼ in) 6.35 mm, 0.3-5 LPM (0.079252 gal/m-1.3209 gal/m), 200 W 220V, 1500 RPM motor.
  d2—motor controller (converts MIN/MAX signal from general controller E into motor speed 0 to maximum RPM)
  d3—Automatic valve: 40 bar, (¼ in) 6.35 mm, Needle.
  d4—oil flow controller: Flowmeter—Turbine, Communication Protocol—Pulse, (¼ in) 6.35 mm, 0.3-5 LPM (0.079252 gal/m-1.3209 gal/m)
  E—SYSTEM CONTROLLER: Siemens RC24 with analog and digital modules of the "input" and "output" lines, 24 volt power supply.
  Eo1—"output" line to automatic water valve [c3]
  Eo2—"output" line to water pump controller [c2]
  Eo3—"output" line to automatic oil valve [d3]
  Eo4—"output" line to oil pump controller [d2] signal with 4-20 mA or 0-10V protocol
  Eo5—"output" line to start burner pump controller [c2]
  Eo6—"output" line to automatic oil control valve for start-up [b3]
  Eo7—"output" line at compressor start-up [c3]
  Eo8—"output" line to ignition transformer [T] 220 v/15 kV 40 mA, Danfoss EB14. For starting spark gap [P].
  Ei0—"input" line to flow controller. Oil flowmeter. Signal protocol—pulse.
  Ei1—"input" line to flow controller. Water flowmeter. Signal protocol—pulse.
  Ei2—"input" line at liquid level MAX. Water level phase 1 [M−1] Floating level sensor. Signal protocol—open/close.
  Ei2—"input" line to photocell, furnace flame control. Signal protocol—open/close Ei3—"input" line to manometer.

Water vapor pressure phase 1 [M-1] Signal protocol—4-20 mA or Autonics controller relay TZN4S.

Ei4—"input" line to thermometer. Vapor temperature phase 1 [M-1] Signal protocol—PPTP or Autonics TZN4S temperature controller relay.

Ei5—"input" line to manometer. Gas pressure phase 2 [M-2] Signal protocol—4-20 mA or Autonics controller relay TZN4S.

Ei6—"input" line to thermometer. Gas temperature phase 2 [M-2] Signal protocol—PPTP or Autonics TZN4S temperature controller relay.

Ei7—"input" line to manometer. Gas pressure phase 3 [M-3] Signal protocol—4-20 mA or Autonics controller relay TZN4S.

Ei8—"input" line to thermometer. Gas temperature phase 2 [M-2] Signal protocol—PPTP or Autonics TZN4S temperature controller relay.

Ei9—"input" line to manometer. Gas pressure phase 4 [M-4] Signal protocol—4-20 mA or Autonics controller relay TZN4S.

Ei10—"input" line to thermometer. Gas temperature phase 4 [M-4] Signal protocol—PPTP or Autonics TZN4S temperature controller relay.

T—Ignition transformer 220 v/15 kV 40 mA, Danfoss EB14. For starting spark gap [H].
  H—High voltage spark gap electrodes. Ceramic. Standard for industrial boilers.
  P—starting burner nozzle.
  S—Main Marching Burner Nozzle
  F—Photocell. Standard for industrial boilers.
  K—Oil atomizer. Oil is entrained through vapor.
L-1—Phase 1 cleaning port stopcock/valve [M-1]
L-2—Phase 2 cleaning port stopcock/valve [M-2]
L-3—Phase 3 cleaning port stopcock/valve [M-3]
L-4—Phase 4 cleaning port stopcock/valve [M-4]
N—Pressure safety valve. Set at 12 bar end pressure.
M-1—Vapor phase
M-2—Gasification phase.
M-3—Fisher-Tropsh process phase.
M-4—Thermal cracking/thermolysis phase As a result, with this configuration, it was possible to mix 50% of oil used in internal combustion engines and 50% of water in the chambers, obtaining a flame temperature of between 1100° C. and 1300° C., with a reading of 0% CO and 6% $CO_2$ without the use of catalysts.

Subsequently, the molybdenum tube was changed for a tube that is composed of the following chemical composition in %: Nickel 40%, Chromium 20%, Tungsten 3%, Molybdenum 12%, Cobalt 2%, Iron 5%, Carbon 1%, Magnesium 0.4%, Silicon 0.4% and the rest 316L stainless steel.

Example 2

With the technical data of example 1 and after 2 hours of operation of the reactor, the following results were obtained:
  1.—% of used oil 48%
  2.—% Fresh Water 52%
  3.—Outlet Temperature 1313° C.

This system is designed for use in industrial boilers, where thermal energy is required in large quantities, low cost and low pollution, delivering heat energy continuously, and being able to generate electricity through a co-generator or vapor/steam turbine coupled to an electric generator.

Other applications of this system are: water desalination, soil drying and many other industrial applications where heat is needed, including industries, due to the ability to scale the device over a wide range during development and manufacturing.

Advantages

The integration of all the processes in a single closed cycle is achieved, where the energy can be delivered to an external device.

Part of the energy produced by the system is used for the needs of extracting hydrogen from the water.

The reaction scheme has been simplified, thanks to the compact arrangement of parts of the system, achieving a single flow of energy.

It makes possible a significant saving of fossil fuel thanks to the production of hydrogen from water, which under normal conditions cannot be used as fuel.

Another significant saving is due to the use of low-quality hydrocarbons as fuel, which cannot be used under normal conditions due to the high content of pollutants.

The invention can be used in all those burners that use solid and liquid hydrocarbon fuels;

the proposed system produces cheaper energy with less damage to the environment.

PART LIST 10 vaporization chamber (10) where the vaporization phase (10) is carried out
  11 pressure gauge connection
  12 thermometer
  13 cleaning port
  14 water inlet
  15 level control
  16 safety valve
10A vaporization chamber (10A) where the vaporization phase is carried out (10A)
  12A thermometer
  13A cleaning port
20 gasification chamber (20) where the gasification phase (20) is carried out
  21 pressure gauge connection
  22 thermometer
  23 cleaning port
  24 atomizer/sprayer
  24a atomizer clean vapor/steam inlet
  24b atomizer fuel inlet
  24c atomizer nozzle
30 gas and vapor/steam chamber (30) where the third phase of gas and vapor/steam mixture (30) is carried out
  31 pressure gauge connection
  32 thermometer
  33 cleaning port
40 secondary gas and vapor/steam chamber (40) thermal cracking phase, which can reach thermolysis
  41 pressure gauge connection
  42 thermometer
  43 cleaning port
50 energy flow
51 connection pipe for vapor/steam flow
51A connection pipe for auxiliary vapor/steam flow. 52 connection pipe for synthesis gas flow
53 connecting pipe for hydrogen flow
54 connecting pipe for gas flow to injector 60 nozzle support module (for burner)
  61 main nozzle
  62 fan
71 male flange
72 female flange
73 projection
74 recess
75 outer barrel
76 inner barrel
77 helical blades
78 inlet funnel
79 outlet funnel
80 outer flange
90 combustion chamber
100 receiving equipment for the heat of the combustion chamber (90), to convert the heat into another type of energy, such as electrical or displacement energy.

The invention claimed is:

1. A system for obtaining energy through the use of waste hydrocarbon and hydrogen produced from water in the generation of combustion energy, wherein part of the energy generated is used in the operation of the same system, achieving high efficiency and low levels of pollution, comprising:
   a combustion chamber with a proximal end and a distal end;
   a nozzle support module located at the proximal end of the combustion chamber;
   at least one main combustion gas outlet nozzle (S) and at least one starting burner nozzle (P), spark gap electrodes (H) located in the nozzle support module;
   at least three hermetic chambers connected in series through connections, which cover the length of a flame, wherein a vaporization chamber where water enters, a gasification chamber where hydrocarbon enters, and at least one thermal cracking chamber surround the combustion chamber;
   a flame outlet, located at the distal end of the combustion chamber; and
   wherein the combustion chamber and the at least three preheating chambers are built with materials with a melting point greater than 1100° C., wherein the materials of the combustion chamber and the three chambers are chosen from molybdenum, lanthanum, tantalum, tungsten, ceramics, nickel, zirconium, chromium, iridium, stainless steels or a mixture thereof.

2. The system for obtaining energy of claim 1, further comprising a fourth phase, wherein a second gas-vapor mixture phase is carried out, which is connected in series with the gas-vapor mixture phase through a connection pipe.

3. The system for obtaining energy of claim 2, further comprising a fifth chamber, where a second vaporization phase is carried out, where the fifth chamber is connected in series between the vaporization chamber, the gasification chamber of mixture of gases and vapor through at least one connection pipe.

4. The system for obtaining energy of claim 1, wherein: a fan is located at the proximal end of the nozzle support module, to improve combustion.

5. The system for obtaining energy of claim 1, wherein the nozzle support module further comprises a secondary nozzle (P) with a fuel inlet and compressed air inlet, for process start-up.

6. The system for obtaining energy of claim 1, wherein temperature sensors are located in each of the chambers; pressure sensors are located in each of the chambers; and cleaning ports are located in each of the chambers; wherein the temperature sensors and the pressure sensors deliver the information to a computer, by wire or wireless.

7. The system for obtaining energy of claim 6, wherein the cleaning ports are manual cleaning ports.

8. The system for obtaining energy of claim 1, wherein the chemical composition of the elements comprising the reactor, to withstand temperatures above 1400° C., comprises:
   at least 15% Nickel; and
   at least 15% Chromium.

9. The system for obtaining energy of claim 8, further comprising the following elements comprising the reactor, to withstand temperatures above 1600° C.:
   at least 2% Tungsten; and
   at least 2% Molybdenum.

10. The system for obtaining energy of claim 9, further comprising the following element comprising the reactor:
    at least 1% Iridium and/or at least 1% tantalum and/or at least 1% cobalt and/or at least 1% iron and/or at least 0.1% magnesium and/or at least 0.1% silicon and/or at least 1% stainless steel.

11. The system for obtaining energy of claim 8, wherein each combustion chamber section related to each chamber are manufactured with different chemical compositions of matter therebetween.

12. The system for obtaining energy of claim 8, wherein the combustion chamber comprises two tubes, one inside the other, where an inner tube has a higher melting point than an outer tube.

13. The system for obtaining energy of claim 8, wherein each chamber is coated with a thermally insulating material to decrease heat transfer to the environment, wherein the thermally insulating material is chosen from cement, ceramics, ceramic fiber, ceramic paper, ceramic paint, fiberglass.

14. The system for obtaining energy of claim 1, wherein the chemical composition of the elements comprising the reactor, to withstand temperatures above 1100° C., comprises:
    at least 40% Nickel;
    at least 20% Chromium;
    at least 3% Tungsten;
    at least 12% Molybdenum;
    at least 2% cobalt;
    at least 5% iron;
    at least 1% carbon;
    at least 0.4% magnesium;
    at least 0.4% silicon and stainless steel until completing 100%.

15. The system for obtaining energy of claim 1, wherein the combustion chamber is internally coated with ceramic material, to increase resistance to temperatures above 2000° C.

16. A method for obtaining energy through the use of waste hydrocarbon and hydrogen produced from water in the generation of combustion energy, where part of the energy generated is used in the operation of the same system, achieving low contamination levels, carried out in the system of claim 1, comprising the steps of:
    converting into water vapor the water in a vaporization chamber in the vaporization phase, which is an integral part of the fuel in a significant amount of the total volume of the mixture;
    mixing the water vapor with a liquid waste hydrocarbon, in a gasification chamber in the gasification phase, and the gasification of hydrocarbons at high temperature takes place; and
    generating the Fischer Tropsch reaction, in gases and vapor, in the gas and vapor mixture phase, with the preparation of a gas mixture of hydrogen, carbon monoxide and carbon dioxide.

17. The method for obtaining energy, according to claim 16, further comprising generating thermolysis in a fourth chamber, in the thermolysis phase, wherein the extreme vapor and hydrocarbon gases, wherein the carbon and oxygen atoms are attracted to each other constituting CO; $CO_2$ and leaving free Hydrogen.

18. The method for obtaining energy, according to claim 16, further comprising increasing the temperature of the water vapor in a fifth chamber, in the vaporization phase coming from the vaporization chamber, wherein the water vapor is heated even more, to enter said water vapor above 250° C. to the gasification chamber in the gasification phase.

19. The method for obtaining energy, according to claim 16, wherein the mixture between water vapor and hydrocarbon vapor in the Fischer Tropsch reaction, corresponding to chamber, is at least 10% water vapor and the differential is hydrocarbon vapors.

20. The method for obtaining energy, according to claim 16, wherein the water that enters, at the stage of converting water into water vapor in a vaporization chamber, to form water vapor is fresh water, graywater, treated blackwater or salt or sea water.

\* \* \* \* \*